United States Patent
Moix Olivé

(10) Patent No.: US 12,405,191 B2
(45) Date of Patent: Sep. 2, 2025

(54) ASPIRATING DETECTION SYSTEM

(71) Applicant: Kidde Fire Protection, LLC, Bradenton, FL (US)

(72) Inventor: Pere Moix Olivé, Barcelona (ES)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 367 days.

(21) Appl. No.: 17/739,771

(22) Filed: May 9, 2022

(65) Prior Publication Data
US 2022/0357244 A1    Nov. 10, 2022

(30) Foreign Application Priority Data

May 10, 2021   (EP) .................................... 21382424

(51) Int. Cl.
*G01N 1/24* (2006.01)
*G01M 99/00* (2011.01)

(52) U.S. Cl.
CPC .............. *G01N 1/24* (2013.01); *G01M 99/00* (2013.01); *G01N 2001/245* (2013.01)

(58) Field of Classification Search
None
See application file for complete search history.

(56) References Cited

U.S. PATENT DOCUMENTS 5,602,757 A *  2/1997  Haseley .................. F04C 28/28
                                                              702/56
6,611,208 B1 * 8/2003  Ketler .................... G08B 17/10
                                                              340/534

2004/0054921 A1    3/2004  Land, III
2010/0271219 A1   10/2010  Lang
2013/0031957 A1 *  2/2013  Shaw .................. G08B 17/113
                                                              73/28.01
(Continued)

FOREIGN PATENT DOCUMENTS

CN      106124985 A    11/2016
CN      106595842 A     4/2017
(Continued)

OTHER PUBLICATIONS

Author Unknown; "Handbook—Vibration"; Trolex Limited; Jun. 19, 2014; 56 Pages.
(Continued)

*Primary Examiner* — Muhammad Adnan
(74) *Attorney, Agent, or Firm* — CANTOR COLBURN LLP (57) ABSTRACT

An aspirating detection system for detecting a fire event in a monitored environment, a method of determining when an aspirator for an aspirating detection system requires maintenance, and a method of calibrating a control module for an aspirating detection system. The aspirating detection system (1) includes an aspirator (2) for sampling air from the monitored environment (100), and a vibration sensor (3) configured to monitor a vibration signature of the aspirator (2). The aspirating detection system (1) may further include a control module (4) in communication with the vibration sensor (3). The control module (4) may be configured to determine if the aspirator (2) requires maintenance based on the vibration signature of the aspirator (2).

7 Claims, 3 Drawing Sheets

(56) References Cited

U.S. PATENT DOCUMENTS

| | | | |
|---|---|---|---|
| 2013/0167649 A1* | 7/2013 | Heda | G01H 1/006 |
| | | | 73/660 |
| 2013/0192341 A1* | 8/2013 | Ajay | B03C 3/366 |
| | | | 96/60 |
| 2015/0042796 A1 | 2/2015 | Lu | |
| 2020/0172269 A1 | 6/2020 | Dechellis et al. | |
| 2020/0317366 A1 | 10/2020 | Clampitt, III et al. | |
| 2020/0317367 A1 | 10/2020 | Clampitt, III et al. | |
| 2022/0316739 A1* | 10/2022 | Ryan | F24F 11/526 |
| 2023/0076348 A1* | 3/2023 | Dourval | G08B 17/10 |
| 2023/0228895 A1* | 7/2023 | Laboureau | G01V 1/288 |
| | | | 73/649 |
| 2024/0161600 A1* | 5/2024 | Ganesan | G08B 29/20 |

FOREIGN PATENT DOCUMENTS

| | | | |
|---|---|---|---|
| CN | 206075107 U | 4/2017 | |
| CN | 107749614 A | 3/2018 | |
| CN | 109578313 A | 4/2019 | |
| CN | 110121598 A | 8/2019 | |
| CN | 109323853 B | 6/2020 | |
| DE | 102018210470 A1 | 1/2020 | |
| EP | 3494560 A1 | 6/2019 | |
| JP | 2002310854 A | 10/2002 | |
| JP | 2011145295 A | 7/2011 | |
| JP | 2013042784 A | 3/2013 | |
| KR | 101381822 B1 | 4/2014 | |
| KR | 101432786 B1 | 9/2014 | |
| WO | WO-2018024984 A1 * | 2/2018 | G08B 17/10 |

OTHER PUBLICATIONS

European Search Report for Application No. 21382424.6; Issued Nov. 2, 2021; 10 Pages.

European Search Report for Application No. 21215748.1; Jan. 31, 2025, 7 Pages.

* cited by examiner

ASPIRATING DETECTION SYSTEM

FOREIGN PRIORITY

This application claims priority to European Patent Application No. 21382424.6, filed May 10, 2021, and all the benefits accruing therefrom under 35 U.S.C. § 119, the contents of which in its entirety are herein incorporated by reference.

TECHNICAL FIELD OF INVENTION

The present invention relates to an aspirating detection system for detecting a fire event in a monitored environment, a method of determining when an aspirator for an aspirating detection system requires maintenance, and a method of calibrating a control module for an aspirating detection system.

BACKGROUND OF THE INVENTION

Aspirating detection systems are generally used to monitor multiple buildings or rooms for airborne particulates or gasses using a single detection system. In a conventional aspirating detection system, air from the one or more buildings or rooms to be monitored is aspirated through a network of one or more pipes to a central aspirating detection unit. The central detection unit then analyses a sample of the aspirated air to detect the airborne particulates or gasses. For example, aspirating detection systems may be configured to detect smoke which may indicate a fire, to detect natural gas which may indicate a gas leak, or to detect carbon monoxide for safety purposes. They may also be implemented for other detection purposes.

There are many advantages in using aspirating detection systems over conventional point detectors. For example, using a network of one or more pipes, which require no electrical power, to cover a large area rather than using an array of multiple point detectors may avoid the need for electrical wiring to be installed or modified in the building or room to be covered. This is particularly relevant for example in buildings of historical importance, where it is desired to preserve the integrity of the building, or for spaces where vandalism of the system's electronics may need to be prevented, such as prisons or public spaces. Additionally or alternatively, this is also particularly relevant for environments in which the introduction of electricity could be hazardous due to the atmosphere, for example in a battery factory, chemical production plant, or otherwise. Further, the implementation of one or more central detection units to detect one or more substances obviates the need for multiple point detectors installed over the area to be monitored. As such the cost of a higher sensitivity detector may be offset by the fact that only a single central detection unit may be necessary to detect a desired substance, rather than a multiplicity of point detectors.

Aspirating detection systems are safety critical and it is therefore important that they are maintained in functional condition. Improvements in this regard are therefore desirable.

SUMMARY OF THE INVENTION

Viewed from a first aspect the invention provides an aspirating detection system for detecting a fire event in a monitored environment, the aspirating detection system comprising: an aspirator for sampling air from the monitored environment; and a vibration sensor configured to monitor a vibration signature of the aspirator.

To aspirate air within the aspirating detection system an aspirator is provided. The aspirator may generate a static pressure differential across the system, such that air from the monitored environment is drawn to the aspirating detection system. Aspirators are mechanical devices which motivate air in a predetermined direction. To motivate the air, aspirators comprise one or more moving parts (e.g. an impeller, blower, rotor etc.). When in use, the moving parts stimulate vibrations in the structure of the aspirator. That is, the aspirator may experience forced oscillations in response to the repetitive motion of its one or more moving parts. These vibrations may be characterised by one or more vibration signatures e.g. spectrums of vibrations. The vibration signatures may change as the structure or operation of the aspirator varies, for example through degradation via repeated use, damage due to impacting debris, the loosening of parts, the loss of lubrication around bearings and/or moving parts, and the like.

The aspirating detection system comprises a vibration sensor, which may be coupled to the aspirator, the vibration sensor configured to monitor a vibration signature of the aspirator. The vibration sensor may be used to monitor how a vibration signature of the aspirator changes in time, or may be used to observe a vibration signature of the aspirator at a predetermined time.

Changes in the vibration signature of the aspirator may be indicative of faults or deterioration in the structure or operation of the aspirator, and hence may be used to determine when the aspirator requires repair or maintenance. If an aspirator is not functioning as intended, the detective capabilities of the aspirating detection system (e.g. for fire or the like) may be harmed. For example, the aspirator may become less capable of drawing air in to the system, and thereby less capable of detecting substances carried by that air.

For aspirating detection systems to efficiently operate, the aspirator should maintain a desired pressure differential across the aspirating detection system such that an acceptable flow rate of sampled air is drawn through the network of pipes from the monitored environment. The sensitivity of the aspiration detection system may generally depend on the airflow speed of the aspiration detection system. Higher airflow speeds may result in a larger volume of air being aspirated from the monitored environment to be sampled, and also decrease the time taken for airborne substances or particulates to travel from the origin of a fire or other detectable event to the aspirating detection system. The detection of airborne particulates or gases may therefore depend on the reliable aspiration of air through the system, and maintaining or ensuring adequate performance of the aspirator in an aspirating detection system is of increased importance.

It is desirable to provide an aspirating detection system which ensures the adequate performance of its aspirator. It is also desirable to provide an aspirating detection system that gives warning of potential faults.

The present invention recognises that changes in the vibration signature of the aspirating detection system may indicate deterioration of the system, and/or may warn of an emerging fault that might worse to thereby detriment functionality of the system. By monitoring the vibration signature of the aspirator, the condition of the aspirator as a whole may be monitored and/or determined, or future failures may be prevented. Ensuring the proper functioning of the aspirator is of increased importance in aspirating detection systems, as the sensitivity of the aspirating detection system correlates to the operation of the aspirator, and therefore by providing a vibration sensor used to monitor the vibration signature of the aspirator, the operational condition of the aspirator may be reliably monitored.

The aspirator may comprise an impeller, and the impeller may be configured to rotate about an axis of the aspirator. The rotational axis of the impeller may be regarded as a longitudinal axis of the aspirator. The aspirator may be a pump, a blower or a fan. The impeller may be the primary component of the aspirator which motivates air. The impeller may be driven by an induction motor or other suitable motive device.

Whilst the aspirator may be a pump, blower or a fan, it will be understood that the aspirator will be a device which is suitable for use in an aspirating detection system e.g. of a fire detection system or the like. For example, the aspirator may generally be housed within a central detection unit of the aspirating detection system. Accordingly the aspirator may be sized such that it can be received within a housing of the central detection unit, and may be housed along with one or more components of the aspirating detection system such as but not limited to a detector, a control module, and the like. For example, the central detection unit may have a volume of: at most 1 litre; at most 1.5 litres; at most 2 litres; at most 3 litres; at most 5 litres; at most 10 litres; at most 15 litres; or at most 20 litres.

The aspirator may comprise a housing. The housing may comprise the impeller, and may also comprise a chamber in which the impeller rotates. The housing may have a volume of at most 0.5 litres; at most 1 litre; at most 1.5 litres; at most 2 litres; or at most 2.5 litres.

The aspirator may comprise one or more fans, rotor or impeller blades. The blades may be at most 25 mm in length; at most 30 mm in length; at most 35 mm in length; at most 40 mm in length; at most 45 mm in length; at most 50 mm in length; at most 55 mm in length; or at most 60 mm in length.

The aspirator may be configured to be powered via a DC electric power supply. The aspirator may be configured to operate at a voltage of: at most 8 V; at most 8.5 V; at most 9.5 V; at most 10.5 V; at most 11.5V; at most 12.5 V; at most 13.5 V; or at most 15 V. The aspirator may be configured to operate at a voltage of: between 0 V and 25 V; between 2.5 V and 20 V; between 5 V and 15 V; or between 8 V and 13.5 V. The aspirator may be configured to operate at 12 V e.g. 12 V DC.

The aspirator may be configured to operate at a current of: at most 500 mA; at most 1000 mA; at most 2000 mA; at most 2500 mA; or at most 3000 mA. The aspirator may be configured to operate at a current of: between 250 mA and 3000 mA; between 750 mA and 2750 mA; between 1250 mA and 2500 mA; or between 1750 mA and 2250 mA. The aspirator may be configured to draw a current as stated above when operating at a voltage range of: between 0 V and 25 V; between 2.5 V and 20 V; between 5 V and 15 V; or between 8 V and 13.5 V. The aspirator may be configured to draw the current at 12 V e.g. 12 V DC.

The aspirator may be a fixed speed aspirator, or the aspirator may be a variable speed aspirator. Fixed speed aspirators may be configured to operate at a set speed. Variable speed aspirators may be configured to operate at a range of speeds.

The aspirator may be configured to operate at a speed of at most 5000 rpm; at most 5500 rpm; at most 6000 rpm; at most 6500 rpm; or at most 7000 rpm. The aspirator may be configured to operate at a speed of: between 5000 rpm and 7000 rpm; between 5300 rpm and 6500 rpm; or between 5600 rpm and 6100 rpm. The aspirator may be configured to operate at the stated speed when operating at a voltage of: between 0 V and 25 V; between 2.5 V and 20 V; between 5 V and 15 V; or between 8 V and 13.5 V.

The aspirator may be configured to aspirate air at a rate of at least 0.25 m3/min; at least 0.5 m3/min; at least 0.75 m3/min; at least 1.0 m3/min; or at least 1.25 m3/min; or at least 1.5 m3/min. The aspirator may be configured to aspirate air at a rate of: between 0 m3/min and 1.5 m3/min; between 0.25 m3/min and 1.25 m3/min; or between 0.5 m3/min and 1.0 m3/min. The aspirator may be configured to operate at a static pressure of: at least 200 Pa; at least 400 Pa; at least 600 Pa; or at least 800 Pa. The aspirator may be configured to operate at a static pressure between: 0 Pa and 1000 Pa; between 200 Pa and 800 Pa; or between 400 Pa and 600 Pa. The aspirator may be configured to aspirate air at the rate stated above and/or operate at the static pressure stated above when operating at a voltage of: between 0 V and 25 V; between 2.5 V and 20 V; between 5 V and 15 V; or between 8 V and 13.5 V.

The vibration sensor may be any suitable device for monitoring the vibration signature, and may be any suitable device which is configured to transfer kinetic or vibrational energy of the aspirator into electrical energy, or an electrical signal. The vibration sensor may be an accelerometer. The accelerometer may be a piezo-electric accelerometer or a piezo-resistive accelerometer.

The vibration sensor may be coupled to the aspirator such that the vibration signature of the aspirator may be monitored and/or sensed by the vibration sensor. The vibration sensor may preferably be coupled directly to the aspirator. The vibration sensor may be coupled to a structure or the housing of the aspirator. That is, the vibration sensor may be mechanically coupled to the aspirator. The vibration sensor may be arranged to detect vibration of the impeller, and may be coupled to the impeller.

The vibration signature may be a measurement of a component of vibration of the aspirator. The vibration signature may be a characteristic or a property of vibration of the aspirator. The vibration signature may be a spectrum of vibrations, and different vibrations may be indicative of different states of the aspirator. The vibration signature may include at least one of the following parameters: frequency, amplitude, phase, frequency spectrum, or RMS and peak. The vibration signature may preferably be at least one of frequency and amplitude. The vibration signature may be directly measured using the vibration sensor. The vibration signature may be derived from measurements taken by the vibration sensor e.g. using a control module.

The vibration sensor may be configured to be used to record/capture the vibration signature. That is, the vibration sensor may monitor/observe a vibration signature of the aspirator before it is recorded/captured using e.g. a control module.

The aspirating detection system may comprise a control module in communication with the vibration sensor. The control module may be configured to receive the vibration signature from the vibration sensor. The control module may be configured to determine if the aspirator requires maintenance based on the vibration signature of the aspirator.

The control module may be in electrical communication with the vibration sensor. The control module may be in wired and/or wireless communication with the vibration sensor. The control module may communicate with the vibration sensor using any known short-range wireless communications protocol.

The control module may be configured to determine a maintenance state of the aspirator based on the vibration signature. Depending on the maintenance state of the aspirator, the control module may determine if the aspirator requires maintenance or not.

The maintenance state of the aspirator may comprise a first state in which the aspirator requires maintenance, or may comprise a second state in which the aspirator does not require maintenance. The vibration signature of the aspirator may vary as the structure/properties/operation of the aspirator varies during operation. Hence depending on monitored value of the vibration signature, the control module may evaluate if the aspirator has significantly degraded and/or deteriorated. The maintenance state may therefore be determined based on the vibration signature of the aspirator. The aspirator may require maintenance to prevent failure or fault, and the use of the vibration sensor may therefore forestall failure of the aspirator, as well as rectify any faults.

The control module may be configured to compare the vibration signature of the aspirator to an operational range. If the vibration signature of the aspirator is not within the operational range, the control module may be configured to determine that the aspirator requires maintenance. If the vibration signature of the aspirator is within the operational range, the control module may be configured to determine that the aspirator does not require maintenance. The control module may therefore determine that the aspirator requires maintenance if and only if the measured vibration signature differs from the operational range e.g. by a predetermined threshold. The control module may be configured to determine that the aspirator requires maintenance upon detection of a predetermined vibration e.g. a predetermined frequency and amplitude of vibration. The control module may be configured to determine that the aspirator requires maintenance upon detection of a plurality of predetermined vibrations.

The control module may be configured to report its determination of the aspirator state. For example, the control module may report that the aspirator and/or aspirator system does not require maintenance, and/or may be configured to report that the aspirator and/or aspirator system does require maintenance. The control module may send a notification, raise an alarm, activate a signal, or otherwise notify that maintenance is required.

The operational range may be a range of values for which the vibration signature is indicative of the aspirator not requiring maintenance e.g. normal operation. That is, the operational range may define an operational window for which the vibration signature of the aspirator is deemed to be indicative of the performance of the aspirator being acceptable. The operational range may be defined by an upper limit and a lower limit. The upper limit may be greater than the lower limit. The operational range may be a predetermined vibration signature characteristic of normal operation of the aspirator, and the control module may be operable to determine that the aspirator requires maintenance if the measured vibration signature deviates from the predetermined vibration signature e.g. by more than a predetermined threshold, or by a predetermined vibration. Thus, an increase or decrease of particular vibrations (e.g. of frequencies or amplitudes) within an otherwise normal range of possible vibrations may cause the control module to determine that the aspirator requires maintenance.

The control module may be configured to compare the vibration signature with each of the upper limit and the lower limit. If the vibration signature does not exceed the lower limit (e.g. falls below the lower limit), the control module may be configured to determine that the aspirator requires maintenance. If the vibration signature exceeds the lower limit, but does not exceed the upper limit, the control module may be configured to determine that the aspirator does not require maintenance. If the vibration signature exceeds the upper limit, the control module may be configured to determine that the aspirator requires maintenance.

The operational range may be set or predetermined based on values determined during factory acceptance testing. For example, it may be assumed that a plurality of aspirators display vibration signatures according to e.g. a Gaussian profile or some other suitable distribution or spectrum. The operational range may therefore be defined relative to a factory-accepted mean vibration signature for the plurality of aspirators. A range may be a range in frequency or may be a range in amplitude.

The lower limit of the operational range may be defined as being at least 5% below the factory-accepted mean vibration signature; being at least 10% below the factory-accepted mean vibration signature; being at least 15% below the factory-accepted mean vibration signature; or being at least 20% below the factory-accepted mean vibration signature.

The upper limit of the operational range may be defined as being at least 5% above the factory-accepted mean vibration signature; being at least 10% above the factory-accepted mean vibration signature; being at least 15% above the factory-accepted mean vibration signature; or being at least 20% above the factory-accepted mean vibration signature.

The control module may be configured to determine that the aspirator and/or aspirating system requires maintenance in the event that it detects a predetermined vibration above a predetermined amplitude.

The vibration sensor may be configured to monitor an initial vibration signature of the aspirator. The control module may be configured to determine the operational range of the aspirator based on the initial vibration signature of the aspirator. The control module may be configured to determine a relative threshold for maintenance based on the initial vibration signature. The relative threshold may define an upper limit and a lower limit of the operational range.

The relative threshold may be at least 5% of the initial vibration signature, at least 10% of the initial vibration signature, at least 15% of the initial vibration signature, or at least 20% of the initial vibration signature. The upper limit may be greater than the initial vibration signature by at least the determined relative threshold. The lower limit may be lower than the initial vibration signature by at least the determined relative threshold.

In this context, the initial vibration signature of the aspirator may be understood to be the monitored vibration signature of the aspirator during first-time-use, installation or set-up, at the start or beginning of the aspirator's operational lifetime, or during a calibration procedure. In other words, the initial vibration signature may be regarded as the vibration signature of the aspirator under the assumption that the aspirator is not degraded, or when the aspirator is in factory condition, i.e. at the beginning of its operational lifetime. Thus, the control module may assume that initial operation of the aspirator is normal (i.e. that there are no faults at first), and may record a corresponding initial vibration signature against which later vibration signatures may be compared to determine the state of the aspirator. The control module may therefore be configured to compare a (later-measured) vibration signature to the initial vibration signature.

The vibration sensor may be configured to be used to record/capture the initial vibration signature. The control module may be configured to store the initial vibration signature. That is, the vibration signature may be monitored/observed at an initial time using the vibration sensor, and may be stored/recorded/captured using the control module. The initial vibration signature may therefore be recalled/accessed when required.

When the aspiration detection system is assembled during manufacture, each aspirator may not display the same vibrational properties. This could be due to manufacturing tolerances regarding each component of the aspirator, particularly including moving parts. It will therefore be appreciated that the vibration signature of one aspirator may not be the same as the vibration signature of another aspirator, even under controlled conditions. To account for this, the control module may determine the operational range for which the aspirator is determined to not require maintenance based on the initial vibration signature of the aspirator.

By basing the operational range on the initial vibration signature of the aspirator, any variation in the vibration signature of the aspirator due to manufacturing tolerances may be accounted for e.g. the appearance of a new vibration at a predetermined frequency and/or amplitude. Further, if the aspirator is a variable speed aspirator and its operational speed is not set until its first use, the operational range may be adjusted such that the control module may still reliably determine if the aspirator requires maintenance or not, regardless of the speed regime the aspirator is set to run at.

The control module may be configured to compare the initial vibration signature to an initial range. If the initial vibration signature is not within the initial range, the control module may be configured to determine that the aspirator requires maintenance.

The initial range may be a range of values for which the initial vibration signature of the aspirator is deemed to be acceptable (i.e. not requiring maintenance). The initial range may be defined by an upper limit and a lower limit. If the initial vibration signature does not exceed the lower limit (e.g. falls below the lower limit), the control module may be configured to determine that the aspirator requires maintenance. If the initial vibration signature exceeds the lower limit, but does not exceed the upper limit, the control module may be configured to determine that the aspirator does not require maintenance. If the initial vibration signature exceeds the upper limit, the control module may be configured to determine that the aspirator requires maintenance.

As discussed above, it may be assumed that a plurality of aspirators display vibration signatures according to e.g. a Gaussian or any other suitable profile when produced. Parameters of the profile such as a factory-accepted, or initial, mean vibration signature may be determined during factory acceptance testing or the like.

The upper limit and the lower limit of the initial range may be defined based on a factory-accepted, or initial, mean vibration signature. For example, the lower limit of the operational range may be defined as being at least 5% below the factory-accepted mean vibration signature; being at least 10% below the factory-accepted mean vibration signature; or being at least 15% below the factory-accepted mean vibration signature. The upper limit of the operational range may be defined as being at least 5% above the factory-accepted mean vibration signature; being at least 10% above the factory-accepted mean vibration signature; being at least 15% above the factory-accepted mean vibration signature.

By determining if the initial vibration signature is or is not within the initial range, the control module may be able to determine if the aspirator is acceptable for use in the aspirating detection system before sustained use. This determination may be of increased importance when the operational threshold is defined using relative thresholds, which may in turn be based on the initial vibration signature. If the initial vibration signature is not checked in a comparison step against an initial range, faulty aspirators may not otherwise be deemed to be faulty until the vibration signature is found to be outside of the operational range.

The vibration sensor may be configured to continuously monitor a vibration signature of the aspirator. That is, the vibration sensor may be configured to constantly observe and/or sense the vibrations of the aspirator.

The control module may be configured to regularly use the vibration sensor to measure the vibration signature, and thereby regularly check the state of the aspirator. The vibration sensor may be configured to intermittently, or periodically, monitor a vibration signature of the aspirator. That is, the vibration sensor may be configured to only observe and/or sense vibrations at specific instances. The periodicity of the measurements may be predefined, or may be in response to an activation signal (e.g. generated by a command from the control module, or by pressing a button).

The control module may be configured to operate the vibration sensor in a first mode. The vibration sensor may be configured to continuously monitor the vibration signature of the aspirator in the first mode. The control module may also be configured to operate the vibration sensor in a second mode. The vibration sensor may be configured to periodically monitor the vibration signature of the aspirator in the second mode.

The control module may be configured to control operation of the aspirator while measuring vibration, and thereby test the aspirator throughout its operational range. For example, for a variable speed system, the control module may be operable to run the aspirator through different speeds to check for faults.

The aspirator may be powered by a mains supply. The aspirator may also be powered by an energy storage device (e.g. a battery). The energy storage device may be used to power the aspirating detection system when the mains supply is not available, e.g. during a power cut to the building or premises the aspirating detection system is monitoring. That is, the aspirating detection system may comprise an energy storage device, and may also be configured to be connected to a mains supply.

The control module may be configured to determine if the aspirating detection system is being powered by the energy storage device. The control module may be configured to operate the vibration sensor in the second mode when the aspirating detection system is being powered by the energy storage device. The control module may also be configured to operate the vibration sensor in the first mode when the aspirating detection system is not being powered by the energy storage device.

By operating the vibration sensor only periodically when the aspirating detection system is being powered by the energy storage device, the aspirating detection system may be able to more efficiently conserve energy and hence increase the operational lifetime of the energy storage device in between charges and/or replacement. This may be of increased importance during power cuts or when the aspirating detection system is not powered by a mains supply, as aspirating detection systems are safety-critical devices. Further, by still operating the vibration sensor still at least periodically when using the energy storage device to power the aspirating detection system, the control module may still be reliably determined whether or not the aspirator requires maintenance.

The vibration sensor may comprise a first vibration sensor and a second vibration sensor. The first vibration sensor may be configured to monitor the vibration signature of the aspirator in a first plane of oscillation e.g. in a first direction. The second vibration sensor may be configured to monitor the vibration signature of the aspirator in a second plane of oscillation e.g. in a second direction. The first plane may be perpendicular to the second plane. Preferably, the first vibration sensor may be configured to monitor the first vibration signature of the aspirator in a radial direction, and the second vibration sensor may be configured to monitor the vibration signature in an axial direction. The component of the vibration signature in the first plane may be regarded as a first vibration signature. The component of the vibration signature in the second plane may be regarded as a second vibration signature. That is, the first vibration signature and the second vibration signature may be components of the same/single vibration signature in a first plane and a second plane respectively. The vibration sensor may comprise a third vibration sensor configured to monitor the vibration signature of the aspirator in a third plane of oscillation e.g. in a third direction. The third plane may be orthogonal to the first and second planes.

An aspirator may generally comprise an impeller centred on an axis of rotation of the aspirator. The axis of rotation of the impeller may define a longitudinal axis of the aspirator. The impeller may generally oscillate or move in two planes of motion. A first plane of motion may lie perpendicular to the axis of rotation. That is, the impeller may oscillate or move in a radial direction, i.e. about its axis of rotation. A second plane of motion may like parallel to the axis of rotation. That is, the impeller may oscillate or move in an axial direction, i.e. along its axis of rotation.

Any suitable number of vibration sensors may be provided to monitor vibration in any suitable number of directions e.g. in three dimensions by monitoring vibrations in three perpendicular directions. By providing a vibration sensor in multiple orthogonal planes of vibration, the vibration signature of the aspirator may be more reliably monitored. If vibrations were only to be monitored in a single plane, i.e. in a plane in which a single vibration sensor was placed, vibrations in a perpendicular plane which may be indicative of degradation of the aspirator may otherwise be undetected. For example, oscillations of an impeller along the axis of its rotation in the aspirator may not cause the aspirator to significantly vibrate in a radial plane, and vice versa. However, these vibrations may be indicative of required maintenance for the aspirator. The provision of a first vibration sensor in a first plane, and a second vibration sensor in a second plane, therefore improves the reliability of the control module's determination of whether or not the aspirator requires maintenance.

The first vibration signature may be a different parameter to the second vibration signature. For example, the first vibration signature may be a frequency, and the second vibration signature may be an amplitude.

Alternatively the first vibration signature and the second vibration signature may be measurements of the same parameter. The first vibration may be a first component of the parameter in the first plane, and the second vibration signature may be a second component of the parameter in the second plane.

The vibration sensor may be configured to monitor a plurality of vibration signatures. Each vibration signature may correspond to a different vibration parameter. Each vibration signature may be compared to a respective operational range.

The vibration sensor may monitor a plurality of initial vibration signatures. Each initial vibration signature may correspond to a different vibration parameter. Each vibration signature may be compared to a respective initial range. A relative threshold may be determined for each initial vibration signature, based on the respective initial vibration signature.

The control module may comprise a processor. The processor may be configured to execute the one or more operations of the control module. The control module may comprise a memory. The processor may execute one or more instructions stored on the memory, to execute the one or more operations of the control module. The memory may be configured to store/record/capture data and/or measurements related to the monitored vibration signature. The memory may also be configured to store/record/capture the initial vibration signature.

The control module may be in communication with one or more aural indicators, visual indicators and fire mitigation devices. The one or more aural indicators and/or visual indicators may alert a user that the aspirator requires maintenance.

The aspirating detection system may comprise a central detection unit (CDU). The CDU may comprise the aspirator, and may additionally comprise the control module. The CDU may further comprise a detector. The detector may be in fluid communication with the aspirator. The aspirator may aspirate air to the detector, such that the detector may detect particulates and/or gases indicative of fire events, for example. The CDU may comprise an energy storage device, and may also be configured to be connected to a mains supply or other source of power, e.g. the electrical grid.

The aspirating detection system may comprise a pipe. The pipe may comprise an opening, and the opening of the pipe may be exposed to the monitored environment. The pipe may be in fluid communication with the aspirator. The pipe may facilitate fluid communication between the detector and the monitored environment.

The aspirating system may be for detecting a gas or gases e.g. natural gas and/or carbon monoxide. The aspirating system may be for use as a known aspirating system, and may be for any suitable detection purpose.

Viewed from a second aspect, the invention provides a method of determining when an aspirator for an aspirating detection system requires maintenance, the method comprising: monitoring a vibration signature of the aspirator; and determining the aspirator requires maintenance based on the vibration signature.

Changes in the vibration signature of the aspirator may be indicative of faults or deterioration in the structure or operation of the aspirator, and hence may be used to determine when the aspirator requires repair or maintenance. If an aspirator is not functioning as intended, the detective capabilities of an aspirating detection system (e.g. for fire or the like) may be harmed.

The present invention recognises that changes in the vibration signature of the aspirating detection system may indicate deterioration of the system. By monitoring the vibration signature of the aspirator, the condition of the aspirator as a whole may be monitored and/or determined, or future failures may be prevented. Ensuring the proper functioning of the aspirator is of increased importance in aspirating detection systems, as the sensitivity of the aspirating detection system correlates to the operation of the aspirator, and therefore by providing a vibration sensor used to monitor the vibration signature of the aspirator, the operational condition of the aspirator may be reliably monitored.

The vibration sensor may be coupled to the aspirator such that monitoring of the vibration signature of the aspirator is possible. The vibration sensor may preferably be coupled directly to the aspirator. The vibration sensor may be coupled to a structure or housing of the aspirator. That is, the vibration sensor may be mechanically coupled to the aspirator. The method may comprise the step of detecting vibration of the impeller, wherein the vibration sensor may be coupled to the impeller. The method may comprise coupling the vibration sensor to the aspirator.

The method may comprise the step of deriving the vibration signature based on and/or from measurements taken by the vibration sensor. Additionally or alternatively, the method may comprise measuring the vibration signature using the vibration sensor.

The method may comprise the step of recording/capturing the vibration signature using the vibration sensor. That is, the method may comprise monitoring/observing the vibration signature of the aspirator before recording/capturing the vibration signature. The step of recording/capturing may be performed using e.g. a control module or processor.

The aspirating detection system may comprise a control module in communication with the vibration sensor, and the method may comprise providing the control module. The step of determining if the aspirator requires maintenance based on the vibration signature may be performed using a control module.

The method may comprise determining a maintenance state of the aspirator based on the vibration signature, and this step may be performed using the control module. Depending on the maintenance state of the aspirator, it may be determined if the aspirator requires maintenance or not.

The maintenance state of the aspirator may comprise a first state in which the aspirator requires maintenance, or may comprise a second state in which the aspirator does not require maintenance. The vibration signature of the aspirator may vary as the structure/properties/operation of the aspirator varies during operation. Hence depending on monitored value of the vibration signature, the method may comprise evaluating if the aspirator has significantly degraded and/or deteriorated. The maintenance state may therefore be determined based on the vibration signature of the aspirator.

The method may comprise comparing the vibration signature of the aspirator to an operational range. The method may comprise the step of determining that the aspirator requires maintenance when the vibration signature of the aspirator is not within the operational range. The method may comprise the step of determining that the aspirator does not require maintenance, when the vibration signature of the aspirator is within the operational range.

The operational range may be defined by an upper limit and a lower limit. The upper limit may be greater than the lower limit.

The method may comprise comparing the vibration signature with each of the upper limit and the lower limit. The method may comprise determining that the aspirator requires maintenance when the vibration signature does not exceed the lower limit. The method may comprise determining that the aspirator does not require maintenance when the vibration signature exceeds the lower limit, but does not exceed the upper limit. The method may comprise determining that the aspirator requires maintenance when the vibration signature exceeds the upper limit.

The method may comprise monitoring an initial vibration signature of the aspirator. The method may comprise determining the operational range of the aspirator based on the initial vibration signature of the aspirator. The method may comprise determining a relative threshold for maintenance based on the initial vibration signature, and the method may comprise defining an upper limit and a lower limit of the operational range based on the relative threshold and the initial vibration signature.

The method may comprise the step of recording/capturing the initial vibration signature using the vibration sensor, and may comprise the step of storing the initial vibration signature. That is, the method may comprise monitoring/observing the vibration signature at an initial time using the vibration sensor, and storing/recording/capturing the monitored/observed vibration signature at the initial time. The initial vibration signature may be stored/recorded/captured using the control module. The method may therefore comprise the step of recalling/accessing the initial vibration signature when required.

When the aspiration detection system is assembled during manufacture, each aspirator may not display the same vibrational properties. This could be due to manufacturing tolerances regarding each component of the aspirator, particularly including moving parts. It will therefore be appreciated that the vibration signature of one aspirator will likely not be the same as the vibration signature of another aspirator, even under controlled conditions. To account for this, the method may comprise determining the operational range for which the aspirator is determined to not require maintenance based on the initial vibration signature of the aspirator.

By basing the operational range on the initial vibration signature of the aspirator, any variance in the vibration signature of the aspirator due to manufacturing tolerances may be accounted for. Further, if the aspirator is a variable speed aspirator and its operational speed is not set until its first use, the operational range may be adjusted such that the control module may still reliably determine if the aspirator requires maintenance or not regardless of the speed regime the aspirator is set to run at.

The method may comprise comparing the initial vibration signature to an initial range. The method may comprise determining that the aspirator requires maintenance when the initial vibration signature is not within the initial range.

The initial range may be defined by an upper limit and a lower limit.

The method may comprise determining that the aspirator requires maintenance when the initial vibration signature does not exceed the lower limit. The method may comprise determining that the aspirator does not require maintenance when the initial vibration signature exceeds the lower limit, but does not exceed the upper limit. The method may comprise determining that the aspirator requires maintenance when the initial vibration signature exceeds the upper limit.

By determining if the initial vibration signature is or is not within the initial range, the method may be able to determine if the aspirator is acceptable for use in an aspirating detection system before sustained use. This determination may be of increased importance when the operational threshold is defined using relative thresholds, which may in turn be based on the initial vibration signature. If the initial vibration signature is not checked in a comparison step against an initial range, faulty aspirators may not otherwise be deemed to be faulty until the vibration signature is found to be outside of the operational range.

The method may comprise continuously monitoring a vibration signature of the aspirator. Alternatively, the method may comprise intermittently, or periodically, monitoring a vibration signature of the aspirator.

The aspirator may be powered by a mains supply. The aspirator may also be powered by an energy storage device (e.g. a battery). The energy storage device may be used to power the aspirator when the mains supply is not available, e.g. during a power cut to the building or premises an aspirating detection system is monitoring.

The method may comprise determining if the aspirator is being powered by the energy storage device. The method may comprise continuously monitoring a vibration signature of the aspirator when the aspirator is not being powered by the energy storage device. The method may comprise intermittently, or periodically, monitoring a vibration signature of the aspirator when the aspirator is being powered by the energy storage device.

By operating the vibration sensor only periodically when the aspirator is being powered by the energy storage device, the aspirator may be able to more efficiently conserve energy and hence increase the operational lifetime of the energy storage device in between charges and/or replacement. This may be of increased importance during power cuts or when the aspirator is not powered by a mains supply, as aspirating detection systems are safety-critical devices. Further, by still operating the vibration sensor still at least periodically when using the energy storage device to power the aspirator, the method may still be reliably determined whether or not the aspirator requires maintenance.

The method may comprise monitoring the vibration signature using a vibration sensor. The vibration sensor may comprise a first vibration sensor and a second vibration sensor. The method may comprise monitoring the vibration signature of the aspirator in a first plane of oscillation. The method may comprise monitoring the vibration signature of the aspirator in a second plane of oscillation. The first plane may be perpendicular to the second plane. The first plane may be a radial direction, and the second plane may be in an axial direction. The component of the vibration signature in the first plane may be regarded as a first vibration signature. The component of the vibration signature in the second plane may be regarded as a second vibration signature. That is, the first vibration signature and the second vibration signature may be components of the same/single vibration signature in a first plane and a second plane respectively.

An aspirator may generally comprise an impeller centred on an axis of rotation of the aspirator. The axis of rotation of the impeller may define a longitudinal axis of the aspirator. The impeller may generally oscillate or move in two planes of motion. A first plane of motion may lie perpendicular to the axis of rotation. That is, the impeller may oscillate or move in a radial direction, i.e. about its axis of rotation. A second plane of motion may lie parallel to the axis of rotation. That is, the impeller may oscillate or move in an axial direction, i.e. along its axis of rotation.

By monitoring a vibration signature in multiple orthogonal planes of vibration, the vibration signature of the aspirator may be more reliably monitored. If vibrations were only to be monitored in a single plane, vibrations in a perpendicular plane which may be indicative of degradation of the aspirator may otherwise be undetected. For example, oscillations of an impeller along the axis of its rotation in the aspirator may not cause the aspirator to significantly vibrate in a radial plane, and vice versa. However, these vibrations may be indicative of required maintenance for the aspirator. Monitoring the vibration signature in a first plane and a second plane therefore improves the reliability of the method's determination of whether or not the aspirator requires maintenance.

The method of the second aspect of the invention may comprise using the aspirating detection system as recited herein with reference to the first aspect of the invention. The method may comprise providing and/or using any and/or all of the features of the first aspect of the invention. The method of the second aspect may therefore have one or more features corresponding to those of the aspirating detection system of the first aspect of the invention. Thus the above description of the aspirating detection system of the first aspect, including but not limited to all technical advantages and alternative embodiments, may be equally applicable to the method of the second aspect.

The method may comprise performing maintenance on the aspirator, and this step may be performed in response to determining that the aspirator requires maintenance.

Viewed from a third aspect, there is provided a method of performing maintenance on an aspirator for an aspiration detection system. The method may have one or more features corresponding to those of the method of the second aspect of the invention, and may further comprise the step of performing maintenance on the aspirator in response to determining that the aspirator requires maintenance. Thus the above description of the method of the second aspect, including but not limited to all technical advantages and alternative embodiments, may be equally applicable to the method of the third aspect. The method of the third aspect of the invention may comprise using the system as recited herein with reference to the first aspect of the invention. The method may comprise providing and/or using any and/or all of the features of the first aspect of the invention.

Viewed from a fourth aspect, the invention provides a method of calibrating a control module for an aspirating detection system, the method comprising: determining an initial vibration signature of an aspirator; comparing the initial vibration signature to an initial range; if the initial vibration signature if not within the initial range: determining that the aspirator requires maintenance; if the initial vibration signature is within the initial range: determining a relative threshold for maintenance based on the initial vibration signature; and defining an upper limit and a lower limit of an operation range based on the relative threshold and the initial vibration signature.

The method of the fourth aspect may have one or more features corresponding to those of the aspirating detection system of the first aspect of the invention, or to the methods of the second and third aspects of the invention. Thus the above descriptions of the aspirating detection system of the first aspect, the method of the second aspect and the method of the third aspect, including but not limited to all technical advantages and alternative embodiments, may be equally applicable to the method of the fourth aspect. The method of the fourth aspect of the invention may comprise using the system as recited herein with reference to the first aspect of the invention. The method may comprise providing and/or using any and/or all of the features of the first aspect of the invention.

The control module may be the control module of the first aspect. Accordingly the method of the fourth aspect may be performed using the aspirating detection system of the first aspect. For example, the step of determining an initial vibration signature of an aspirator may be performed using a vibration sensor. The steps of comparing the initial vibration signature to an initial range, determining that the aspirator requires maintenance, determining a relative threshold for maintenance based on the initial vibration signature, and defining an upper limit and a lower limit of an operational range based on the relative threshold and the initial vibration signature may be performed using and/or on the control module belonging to the first aspect.

BRIEF DESCRIPTION OF THE DRAWINGS

Certain exemplary embodiments of the invention are described below by way of example only and with reference to the accompanying drawings in which.

DETAILED DESCRIPTION OF THE INVENTION

Figure 1:
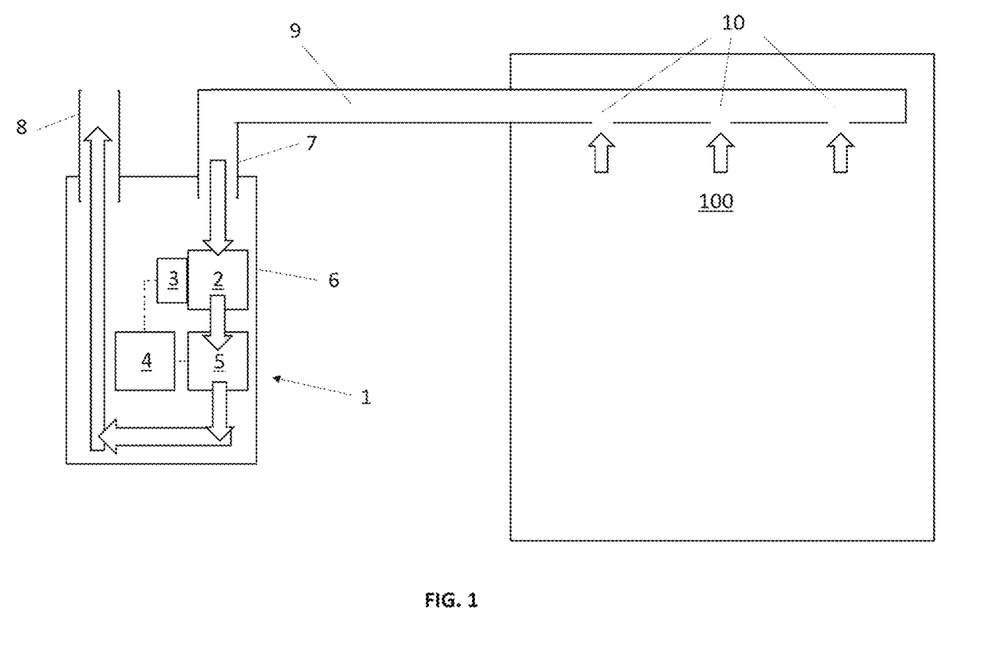
FIG. 1 shows a schematic diagram of an aspirating detection system monitoring an environment.

FIG. 1 shows an aspirating detection system 1 monitoring an environment 100. The aspirating detection system 1 comprises a housing 6 which contains an aspirator 2, a vibration sensor 3, a control module 4 and a detector 5. The housing 6 also comprises an inlet 7 and an outlet 8. The aspirating detection system 1 is in fluid communication with the monitored environment 100 via a pipe 9. The pipe 9 comprises a number of openings 10 which are exposed to the monitored environment 100, and is fastened to the inlet 7 of the housing 6 at the opposite end of the pipe 9. Whilst a single pipe 9 comprising three openings 10 is shown in FIG. 1, it will be appreciated that in various embodiments the pipe 9 may be part of a network of pipes, each pipe exposed to a different monitored environment 100.

The aspirator 2 aspirates air from the monitored environment 100, via the pipe 9. The pipe 9 therefore facilitates the flow of sampled air from the monitored environment 100 and to the aspirating detection system 1. The aspirator 2 is in flow communication with the detector 5, and hence aspirates air from the monitored environment 100 to the detector 5, where its composition can be analysed. The detector 5 is arranged to pass the sampled air to the outlet 8 of the housing 6, where sampled air is exhausted.

The detector 5 senses particulates or gases which may be indicative of a fire event. In various embodiments the detector 5 can be arranged to detect at least one of smoke, carbon monoxide, carbon dioxide, nitrogen oxides, sulphur dioxides, methane, volatile organic compounds and the like. The detector 5 can be any known detector which may detect particulates, substances or gases indicative of a fire event or other safety hazard.

The aspirator 2 creates a static pressure, which results in a pressure differential across the aspirating detection system 1. Air from the monitored environment 100 is motivated into the aspirating detection system 1 due to the created pressure differential. The aspirator 2 is a blower comprising a rotor or impeller 12, and the speed of rotation of the impeller 12 therefore determines the flow rate of the aspirated air.

The sensitivity of the detector 5 depends on the flow rate of the aspirated air. Generally, the detector 5 is able to detect particulates or gases which are indicative of fire events at the flow rate, or speed, of the aspirator 2. Accordingly, the greater the speed of the fan 2 the higher the sensitivity of the detector 5, as a greater volume of particulates or gases may be detected. The function of the aspirator 2 is therefore safety critical. That is, the reliable detection of fire events by the aspirating detection system 1 relies on the aspirator 2 functioning as intended.

To monitor the functioning of the aspirator 2, the aspirating detection system 1 comprises the vibration sensor 3. The vibration sensor 3 monitors a vibration signature of the aspirator 2. A significant deviation in the vibration signature of the aspirator 2 may generally be indicative of the aspirator 2 requiring maintenance.

Figure 2A:
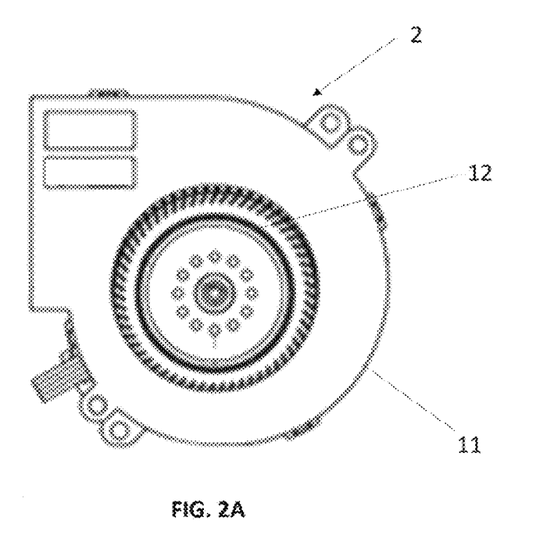
FIG. 2A shows a top-down view of an aspirator.
Figure 2B:
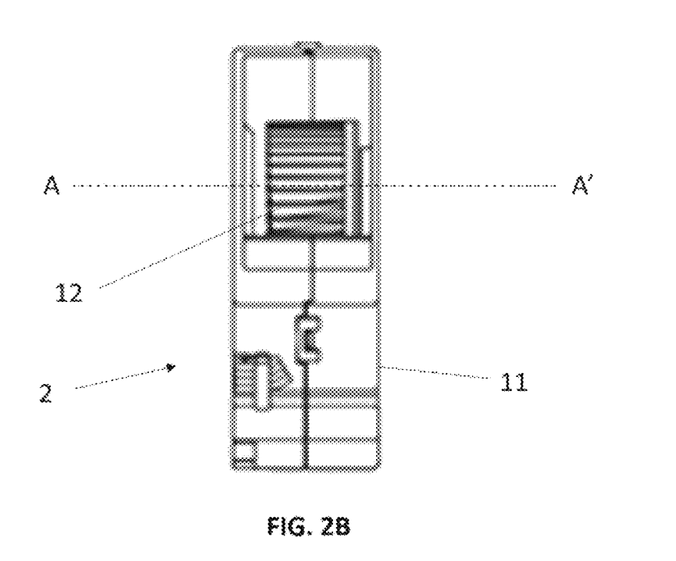
FIG. 2B shows a cross-sectional side view of an aspirator.

As shown in FIGS. 2A and 2B, the aspirator 2 comprises a housing 11 and the impeller 12. The impeller 12 rotates about a rotational axis A-A'. The rotation of the impeller 12 stimulates the aspirator 2 and causes it to vibrate. The forced oscillations induced by the impeller 12 are detected by the vibration sensor 3, which is coupled to the housing 11 of the aspirator 2. The vibrations of the aspirator are characterised by one or more vibration signatures, the vibration signatures corresponding to at least one of a measurement of the frequency, amplitude, phase, frequency spectrum, or RMS and peak of the aspirator 2. The vibration signature varies depending on the function of the impeller 12 (as well as the interactions of the impeller 12 with the housing 11 of the aspirator 2), and therefore any degradation or deterioration of the impeller 12, and hence of the aspirator 2, will result in a change in the vibration signature. The vibration sensor 3 therefore measures or senses the vibration signature of the aspirator 2 such that it can be determined if the aspirator 2 requires maintenance or not.

Thus by providing a vibration sensor 3 configured to monitor the vibration signature of the aspirator 2, the condition of the aspirator 2 can be monitored and any degradation or deterioration in the function of the aspirator 2 can be determined. The condition of the aspirator 2 can be maintained as a result, and proper functioning of the aspirator 2, and hence the aspirating detection system 1 as a whole, can be more reliably ensured.

The vibration sensor 3 is in communication with the control module 4, such that the control module 4 receives the vibration signature from the vibration sensor 3. The control module 4 is able to determine if the aspirator 2 requires maintenance, based on the vibration signature.

To determine if the aspirator 2 requires maintenance, the control module 4 compares the vibration signature to an operational range. The operational range defines the range of values, or a window of values, for which the vibration signature is deemed to be indicative of a properly functioning aspirator 2. Thus if the control module 4 compares the vibration signature to the operational range and the vibration signature sits outside of the operational range, the control module 4 determines that the aspirator 2 requires maintenance. On the other hand, if the vibration signature is within the operational range then the aspirator 2 is determined to be functioning as intended and does not require maintenance.

In the preferred embodiment, the operational range is determined based on an initial vibration signature of the aspirator 2. However, in various embodiments the operational range can be predetermined, and may be defined according to a predetermined set of acceptable values for the vibration signature.

Focussing on the preferred embodiment, the vibration sensor 3 is used to record an initial vibration signature of the aspirator 2. When the aspirator 2 is first switched on or used, e.g. upon a first-time use of the aspirator 2 or following reconfiguration, repair or maintenance of the aspirator 2, the vibration sensor 3 monitors the vibration signature of the aspirator 2 and communicates it to the control module 4. The control module 4 then records or stores the monitored vibration signature at this time as the initial vibration signature.

The control module 4 can use the initial vibration signature to determine the operational range. This may be of benefit as not all aspirators 2 will necessarily display the same vibration signature regardless of how controlled their manufacture is. The vibration signature will depend on the manufacturing tolerances of the aspirator 2, the interactions and coupling between the housing 11 and the impeller 12 of the aspirator 2, and other such factors or variables. Despite this, the aspirator 2 may generally be regarded as properly functioning as long as the vibration signature of the aspirator 2 does not significantly deviate from its initial vibration signature.

Accordingly, the control module 4 is configured to determine a relative threshold based on the initial vibration signature of the aspirator 2. In the preferred embodiment, the relative threshold is at least 5% of the initial vibration signature. The operational range will accordingly be defined based on the initial vibration signature and the relative threshold. The lower limit of the operational range will be at least 5% below the initial vibration signature, and the upper limit of the operational range will be at least 5% above the initial vibration signature.

The aspirator 2 may, in some instances, be faulty upon first time use. It is beneficial to determine if the aspirator 2 is fully functioning before determining the operational range, such that a faulty aspirator is not deemed safe for use in the aspirating detection system 1. To ensure that the aspirator 2 is not faulty upon first time use, the control module 4 is also configured to compare the initial vibration signature to an initial range. If the initial vibration signature is not within the initial range, the control module 4 determines that the aspirator 2 requires maintenance. If the initial vibration signature is within the initial range, then the aspirator 2 is not determined to require maintenance, and subsequently the initial vibration signature will be suitable for determining the operational range of the vibration signature.

By checking if the initial vibration signature is within the initial range, it can be ensured that a faulty aspirator is not deemed to not require maintenance upon first-time use.

The initial range can be regarded as a range or window of values for which the initial vibration signature is deemed to be acceptable, or is not indicative of the aspirator 2 being faulty and/or requiring maintenance. As mentioned above, aspirators may display a range of vibration signatures due to their manufacturing tolerances and the like. This range of values can be determined during factory-acceptance testing or similar methods, and the initial range can generally be defined according to these values. Hence in the preferred embodiment, the initial range can be defined as being within a 10% tolerance of the factory-accepted mean value.

In various embodiments, the initial range can instead be defined such that at least 95% of aspirators are found to be within the initial range. It will be appreciated that the vibration signature of a plurality of aspirators will generally display a normal distribution, and as such defining the initial range such that the majority, or most, of the aspirators are found to not require maintenance according to their initial vibration signature is preferable.

Figure 3:
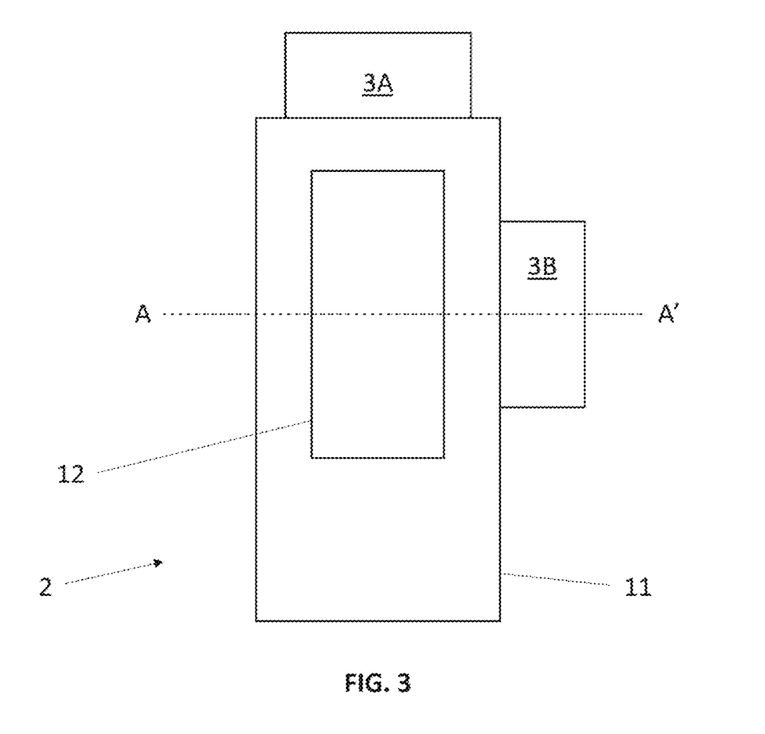
FIG. 3 shows a schematic diagram of two vibration sensors coupled to an aspirator.

FIG. 3 shows a schematic diagram of two vibration sensors 3A, 3B coupled to the aspirator 2. A first vibration sensor 3A is coupled such that it can monitor radial vibrations of the impeller 12 about its rotational axis A-A', and a second vibration sensor 3B is coupled to the housing 11 of the aspirator 2 such that is can monitor axial vibrations of the impeller 12 along its rotational axis A-A'.

During rotation, the impeller 12 can either oscillate along its rotational axis A-A' (i.e. it vibrates in the axial plane), or it can oscillate about its rotational axis A-A' (i.e. it vibrates in the radial plane). However, as the axial plane and the radial plane are perpendicular to one another a single vibration sensor may not be able to accurately detect vibrations in both of these planes. It will be appreciated that the performance of the aspirator 2 can be reliably monitored using only a single vibration sensor 3. However, in various embodiments, the aspirating detection system 1 comprises a first vibration sensor 3A configured to monitor a first vibration signature and a second vibration sensor configured to monitor a second vibration signature. The first vibration signature can be regarded as a radial component of the vibration signature, and the second vibration signature can be regarded as an axial component of the vibration signature.

The control module 4 can compare each vibration signature with a respective operational range, and each operational range can be determined using a respective initial vibration signature, as described above. The provision of a vibration sensor 3A, 3B in each plane of oscillation for the impeller 12 can improve the reliability of the determination as to whether or not the aspirator requires maintenance.

Figure 4:
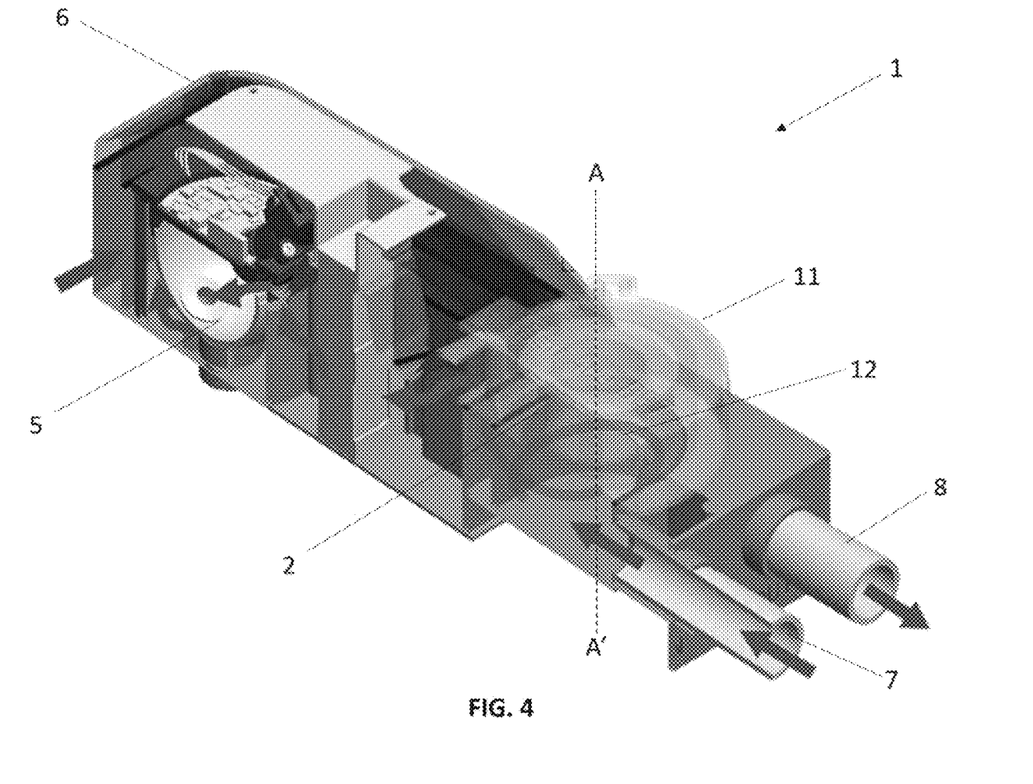
FIG. 4 shows a perspective cross-sectional view of an aspiration detection system.

FIG. 4 shows a perspective cross-sectional view of an aspirating detection system 1. The vibration sensor 3 and the control module 4 are not illustrated. As can be seen, the aspirator 2 and the detector 5 are located in and/or on the housing 6 of the aspirating detection system 1. The impeller 12 rotates about its rotational axis A-A' within the housing 11 of the aspirator 2, which motivates air into the aspirating detection system 1. The airflow through the aspirating detection system 1 is shown using a series of arrows. The air is drawn in through the inlet 7 via the aspirator 2. The rotational motion of the impeller 12 imparts a swirl on the airflow, before the aspirated air is passed to the detector 5. The aspirated air is analysed within a chamber of the detector 5 before it exits via an opening in the chamber of the detector 5. The air then flows out of the aspirating detection system 1 via the outlet 8.

What is claimed is:

1. An aspirating detection system (1) for detecting a fire event in a monitored environment (100), the aspirating detection system (1) comprising:
   an aspirator (2) for sampling air from the monitored environment (100);
   a vibration sensor (3) configured to monitor a vibration signature of the aspirator (2); and
   a control module (4) in communication with the vibration sensor (3);
   wherein the control module (4) is configured to determine if the aspirator (2) requires maintenance based on the vibration signature of the aspirator (2);
   wherein the control module (4) is configured to:
   compare the vibration signature of the aspirator (2) to an operational range; and
   if the vibration signature of the aspirator (2) is not within the operational range, determine that the aspirator (2) requires maintenance;
   wherein the vibration sensor (3) is configured to monitor an initial vibration signature of the aspirator (2);
   wherein the control module (4) is configured to determine a relative threshold for maintenance based on the initial vibration signature, the relative threshold for maintenance defining an upper limit and a lower limit of the operational range.

2. An aspirating detection system (1) as claimed in claim 1, wherein the control module (4) is configured to:
- compare the initial vibration signature to an initial range; and
- if the initial vibration signature is not within the initial range, determine that the aspirator (2) requires maintenance.

3. An aspirating detection system (1) as claimed in claim 1, wherein the vibration sensor comprises a first vibration sensor (3A) configured to monitor a first vibration signature of the aspirator (2), and a second vibration sensor (3B) configured to monitor a second vibration signature of the aspirator (2).

4. An aspirating detection system (1) as claimed in claim 1, wherein the aspirator (2) comprises an impeller (12).

5. A method of determining when an aspirator (2) for an aspirating detection system (1) requires maintenance, the method comprising:
- monitoring a vibration signature of the aspirator (2);
- determining if the aspirator (2) requires maintenance based on the vibration signature;
- comparing the vibration signature to an operational range and if the vibration signature is not within the operational range, determining that the aspirator (2) requires maintenance;
- monitoring an initial vibration signature of the aspirator (2);
- determining a relative threshold for maintenance based on the initial vibration signature; and
- defining an upper limit and a lower limit of the operational range based on the relative threshold and the initial vibration signature.

6. A method as claimed in claim 5, the method comprising:
- comparing the initial vibration signature to an initial range; and
- if the initial vibration signature is not within the initial range, determining that the aspirator (2) requires maintenance.

7. A method of calibrating a control module (4) for an aspirating detection system (1), the method comprising:
- determining an initial vibration signature of an aspirator (2);
- comparing the initial vibration signature to an initial range;
- if the initial vibration signature is not within the initial range:
- determining that the aspirator (2) requires maintenance;
- if the initial vibration signature is within the initial range:
- determining a relative threshold for maintenance based on the initial vibration signature; and
- defining an upper limit and a lower limit of an operational range based on the relative threshold and the initial vibration signature.

\* \* \* \* \*